2,485,815

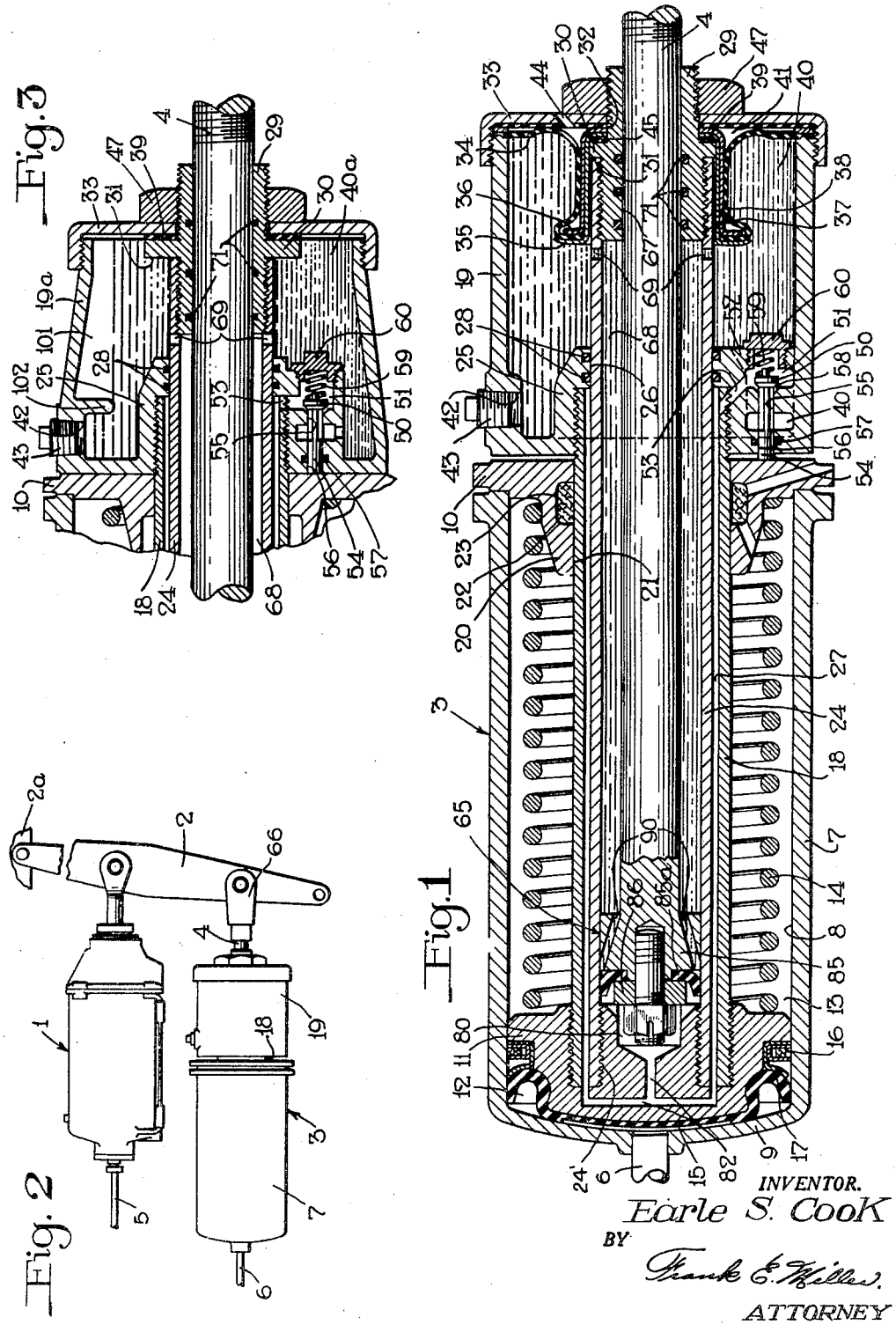
Oct. 25, 1949. E. S. COOK 2,485,815
EMPTY AND LOAD BRAKE EQUIPMENT
Filed Nov. 29, 1947
INVENTOR.
Earle S. Cook
BY
Frank E. Miller
ATTORNEY Patented Oct. 25, 1949

UNITED STATES PATENT OFFICE 2,485,815

EMPTY AND LOAD BRAKE EQUIPMENT

Earle S. Cook, Forest Hills, Pa., assignor to The Westinghouse Air Brake Company, Wilmerding, Pa., a corporation of Pennsylvania Application November 29, 1947, Serial No. 788,805

8 Claims. (Cl. 188—107)

1

This invention relates to fluid pressure motors, and more particularly to a fluid pressure motor adapted for use as a load brake cylinder device in a type of empty and load brake equipment employing two brake cylinder devices, an empty and a load, operatively connected to a common brake lever for effecting braking of a railway car or the like according to the empty or loaded condition thereof.

In brake equipment of the type mentioned above, the empty brake cylinder device provides for actuating the brake lever to take up slack in the brake rigging and to apply the brakes on the car when it is empty, while the load brake cylinder device remains idle. When the car is loaded, the empty brake cylinder device operates, as on an empty car, to take up the slack in the rigging and to effect a brake application followed by operation of the load brake cylinder device to effect additional braking.

The usual load brake cylinder device comprises a load piston and attached hollow piston rod in which is disposed a load push rod connected to the brake lever. When the brake lever is actuated initially by the empty brake cylinder device, the load piston remains stationary while movement of said lever carries the load push rod to an extended position. When the load brake cylinder device is then brought into action, the extended load push rod is automatically locked for unitary movement with the load piston so that additional force thereby will be applied to the brake lever for increased braking of the loaded car.

An object of the invention is to provide an improved fluid pressure motor particularly adapted for use as a load brake cylinder device of the above type.

Other objects and advantages of the invention will be apparent from the following more detailed description thereof.

In the accompanying drawing; Fig. 1 is a longitudinal sectional view, partly in outline, of the improved fluid pressure motor embodying the invention; Fig. 2 is a schematic view in outline of said fluid pressure motor embodied in a load compensating brake equipment; and Fig. 3 is a modification of a portion of the fluid pressure motor shown in Fig. 1.

Description—Fig. 1

As shown in Fig. 2, the reference numeral 1 designates the usual brake cylinder device, which may be called the empty brake cylinder device, operatively connected to a brake cylinder lever

2

2; while the reference numeral 3 designates the improved brake cylinder device, which may be called a load brake cylinder device, and which is also operatively connected by means of a push rod 4 to the same brake lever. The lever 2 may be pivotally connected at its one end to a fixed member 2a of a car while its opposite end is adapted to be connected to brake rigging (not shown) in such a manner that actuation of said lever in a counterclockwise direction will apply the brakes on a car employing the equipment. Both of the brake cylinder devices 1 and 3 are adapted to be supplied with actuating fluid under pressure by way of respective pipes 5 and 6 by any usual brake controlling valve device (not shown).

In this type of arrangement, it is usual that slack take-up of the brake rigging and braking of the car when same is empty is effected by operation solely of the empty brake cylinder device 1 through actuation of lever 2. During such actuation, the load brake cylinder device remains idle, but the push rod 4 thereof must be free to travel inoperatively with the lever 2. With the car loaded, slack take-up as before is effected by the empty brake cylinder device 1 as well as initiation of an application of the brakes through actuation of the lever 2, carrying the push rod 4 of the load brake cylinder device 3 with it freely to an extended position; followed by additional braking force being effected by the load brake cylinder device through application of additional force to the lever 2 through the previously extended push rod 4, in a manner as will hereinafter be clearly brought out.

Referring now to Fig. 1, the improved brake cylinder device 3 comprises a cylinder casing 7 which is intended to be rigidly secured to a fixed car member (not shown). The casing 7 is provided with a central bore 8 closed at its one end in the usual manner by a pressure head 9, and at its opposite end by a non-pressure head 10 which is adapted to be rigidly secured to said casing. Within the cylinder casing 7 is slidably mounted a brake cylinder piston 11 having the usual pressure chamber 12 on its one side, and the usual non-pressure chamber 13 on its opposite side. Pressure chamber 12 is adapted to be supplied with fluid under pressure from the pipe 6 connected thereto to effect movement of piston 11 in the direction of non-pressure chamber 13 for exerting a force on push rod 4. The usual return spring 14 is disposed in non-pressure chamber 13, interposed between piston 11 and non-pressure head 10, for returning said piston to its rest position, in which position it is shown in the drawing, upon release of fluid under pressure from pressure chamber 12.

To prevent leakage of fluid under pressure from the pressure chamber 12 past the piston 11 into the non-pressure chamber 13, a snap-on packing cup 15 in the usual form is provided on the face of said piston exposed to pressure of fluid in chamber 12.

The usual lubricating swab 16 encased in an expander ring is disposed within a peripheral groove in the piston 11 for slidable contact with the cylinder wall of bore 8 to distribute thereon lubricant stored in said swab. A guide ring 17 is also disposed in the same peripheral groove to form a guide shoulder for the skirt portion of cup 15.

According to a feature of the invention, a first hollow piston rod 18 is secured at one end, by screw-threads or other suitable means, to the piston 11 for movement therewith. The rod 18 extends through the non-pressure chamber 13 and the non-pressure head 10 and to its opposite end outside of said non-pressure head there is attached by suitable means, such as by the screw-threads shown in the drawing, one end of a liquid reservoir 19.

An inwardly extending boss 20 is formed in the non-pressure head 10 for guidably supporting the rod 18. The boss 20 is provided with a central bore 21 which forms a wall for slidable engagement with the outer surface of rod 18. An annular porous filter member 22 is disposed in a groove 23 in the boss 20 for engagement with the outer surface of the rod 18 to prevent dust or abrasive particles from reaching the chamber 13 which might tend to enter between said rod and said boss.

A second hollow piston rod 24, having an outer diameter less than the inner diameter of the first hollow piston rod 18, is secured at one end centrally to the piston 11 by screw-threads 24' or other suitable means, and extends through the hollow piston rod 18 into the reservoir 19. A boss 25 is formed in the reservoir 19 extending inwardly beyond the end of piston rod 18 for supporting the rod 24. A central bore 26 in boss 25 forms an annular shoulder into which rod 24 is fitted. An annular clearance passage 27 is formed between the outer surface of rod 24 and the inner surface of rod 18 for reasons which will hereinafter become obvious, and sealing rings 28 are disposed in grooves in boss 25 to cooperate with the outer surface of rod 24 to form a fixed fluid tight seal between said boss and rod 24 for preventing leakage of fluid thereby from said annular passage 27 to the interior of reservoir 19.

To the projecting end of the hollow piston rod 24 is secured a sleeve member 29, attached by screw-threads to the inner wall of said rod. The member 29 is provided with a radial outwardly projecting annular rib 30 which forms an annular shoulder 31 for seating engagement on the end of hollow rod 24 to limit the degree of threaded insertion of said member into said rod. The sleeve member 29 extends beyond the rib 30 and projects outwardly through a central opening 32 in a head 33 which closes one end of the reservoir 19. The head 33 is secured by screw-threads to the outer periphery of reservoir 19 at the projecting end thereof.

Clamped at the outer edge between the end of reservoir 19 and the head 33 is a collapsible, resilient annular diaphragm 34, the inner edge of which is clamped between two outwardly projecting radial flanges 35 and 36 formed respectively at one end of two hollow cylindrical members 37 and 38 fit around the hollow piston rod 24. The opposite ends of the members 37 and 38 are provided with inwardly projecting annular flanges which are clamped between a shoulder 39 formed on the rib 30 of member 29 and the head 33. The diaphragm 34 within reservoir 19 separates a liquid storage chamber 40 from an atmospheric chamber 41. Chamber 40 is adapted to be filled with any desired liquid, such as water or oil, by way of an opening 42 in the upper side of reservoir 19, a removable plug 43 being provided in said opening to retain said liquid. A port 44 through head 33 opens the chamber 41 to the atmosphere. An annular sealing member 45 is also clamped between the head 33 and rib 30 to insure a liquid pressure tight seal between chambers 40 and 41. A nut 47 is screwed onto the outwardly projecting portion of sleeve member 29 for cooperation with the outer surface of the head 33 to assure the clamping action just described.

To control communication between the annular passage 27 between hollow piston rods 18, 24 and the liquid storage chamber 40 in reservoir 19, a valve 50 is provided disposed within a chamber 51 formed in a rib portion 52 within said reservoir. The rib 52 extends radially from the boss 25 to the inner cylindrical wall of the reservoir. A passage 53 through the boss 25 and hollow piston rod 24 opens chamber 51 to passage 27. The valve 50 is secured to one end of a fluted portion of a stem 54 slidably mounted in a bore 55 opening between a portion of chamber 40 and the chamber 51. Stem 54 is provided with a solid cylindrical portion which extends through a bore 56 opening out from chamber 40 through an end wall of reservoir 19 in the direction of and for engagement by the non-pressure head 10. A sealing ring 57 is disposed in a groove in bore 56 for sliding, sealing engagement with the peripheral surface of the cylindrical portion of stem 54 to prevent leakage of liquid past said stem within said bore.

In the position of the reservoir 19 in which it is shown in the drawing relative to the brake cylinder casing 7, the stem 54 is disposed in engagement with the outer end surface of the non-pressure head 10, and by such engagement holds the valve 50 disposed away from a seat 58 formed at an entrance to the bore 55 so that chambers 40 and 51 are thereby connected. A compression spring 59 is also disposed in the chamber 51 and arranged to urge valve 50 in the direction of its seat 58, and in turn to urge stem 54 in the direction of the non-pressure head 10. A removable cap 60 closes one end of chamber 51, so that by removal of said cap, the spring 59, valve 50, and attached stem 54 may be removed for inspection, repair, or replacement.

The push rod 4 is slidably mounted in a bore 67 in the sleeve member 29 and extends through the hollow piston rod 24 and is provided at its inner end adjacent the brake cylinder piston 11 with a piston 65 having sliding contact with the inner wall of rod 24. The outer end of rod 4 is adapted by means of screw-threads for attachment to a clevis 66 (shown in Fig. 1) which in turn may be connected to a lever or the like to be actuated, such as the brake cylinder lever 2.

The rod 4 is of lesser diameter than the inner diameter of the hollow piston rod 24 and cooperates therewith to form an annular chamber 68 therebetween. Chamber 68 is open by way of a plurality of ports 69 through the hollow piston rod 24 to the liquid storage chamber 40 in reservoir 19. The chamber 68 is closed at the adjacent end by one end of the sleeve member 29, and a plurality of annular sealing rings 71 disposed within grooves in said member cooperate in slidable, sealing engagement with the outer surface of the push rod 4 to prevent leakage of liquid from the annular chamber 68 past said rod through bore 67.

The chamber 68 at one side of the piston 65 attached to the push rod 4 is adapted to be constantly filled with liquid from chamber 40 in reservoir 19 by way of ports 69. At the opposite side of piston 65 is a pressure chamber 80 which is constantly open to the annular passage 27 between the two hollow piston rods 18, 24 by way of passages 82 in the piston 11, and said chamber 80 will also be constantly filled with liquid from reservoir 19, as will be later described. The piston 65 comprises a head 85 and an annular resilient packing cup 85a clamped to said head by a washer member 86 which is secured in place by a nut threadably attached to a stud bolt extending through said washer into a central opening in the end of said head with which it is in screw-threaded attachment. By engagement of washer member 86 with an annular shoulder formed on the adjacent face of piston 11, as shown in the drawing, a limit position is defined for travel of push rod 4 into the cylinder casing 7 when piston 11 is disposed in its rest position in which it is shown in the drawing.

The packing cup 85a is held against the inner wall of the hollow piston rod 24 for slidable engagement therewith and is curved in the direction of pressure chamber 80 so that pressure of liquid in said chamber will expand the peripheral portion of said cup outwardly into sealing engagement with said wall. On the other hand, pressure of liquid acting on the opposite side of cup 85 will compress the peripheral portion of said cup inwardly to allow said liquid to flow past it.

Ports 90 are provided in the piston head 85 to connect chamber 68 at one side of said head to the opposite side thereof behind the packing cup 85. Little resistance is offered to movement of the piston 65 in the direction of chamber 68 by a pulling force on rod 4, since liquid is free to travel past said piston during said movement.

*Operation—Fig. 1*

During operation of the load compensating apparatus shown in Fig. 2, for example, while lever 2 is actuated by operation of the empty brake cylinder device 1, said lever 2 will cause the push rod 4 and piston 65 to be pulled outwardly from the load brake cylinder device 3, while the piston 11 and reservoir 19 thereof remain stationary. The rod 4 thus will be pulled through the sleeve member 29 attached to reservoir 19, since said reservoir is reluctant to move therewith because of its attachment to hollow piston rods 18, 24 which are in turn attached to piston 11 the movement of which is at this time opposed by the force of the return spring 14, as well as incidental friction between all members concerned.

During outward movement of push rod 4 with the lever 2, to maintain the chamber 80 filled with liquid, some liquid in the annular chamber 68 will be forced through the ports 90 in piston 65 past the cup 85a into chamber 80 as it is caused to move in the direction of chamber 68 with said push rod. There will also be a tendency for movement of piston 65 to force liquid from chamber 68 through ports 69 into storage chamber 40 in reservoir 19, and such may be the case, especially if the diaphragm 34 is slightly collapsed and will allow an addition of liquid in chamber 40 to expand said diaphragm into the atmospheric chamber 41. Whether liquid in chamber 68 is displaced into chamber 40 by movement of piston 65 or whether said liquid flows past the cup 85 into chamber 80 is not significant, actually both actions may take place simultaneously to greater or lesser degree. The push rod 4, it will be understood, moves freely with the lever 2, as same is actuated by the empty brake cylinder device 1.

At the same time that liquid flows into chamber 80 past the cup 85a during movement of piston 65 and rod 4, liquid may also flow thereto from chamber 40 in reservoir 19 by way of bore 55, the fluted stem 54, the open valve 50, chamber 51, the annular passage 27 between the hollow piston rods 18, 24, and the passages 82 in the piston 11, in order to keep the chamber 80 constantly filled with liquid regardless of the position of the rod 4 and piston 65.

When fluid under pressure, compressed air, for example, such as is used in railway car braking systems, is supplied via pipe 6 to the pressure chamber 12 in the load brake cylinder device 3 for applying additional force to lever 2 after movement of same has effected slack take-up of the brake rigging; the push rod 4 may be substantially stationary and in an extended position in which the piston 65 attached thereto is disposed some distance away from the piston 11. The pressure of fluid in chamber 12, when increased sufficiently, will cause piston 11 to move in the direction of the non-pressure chamber 13, overcoming opposition of spring 14.

Movement of piston 11 in the direction of chamber 13 will carry with it the attached hollow piston rods 18, 24, including the reservoir 19 in turn attached to said rods. At this time, there will be a great reluctance to movement of the push rod 4 in an extended direction tending to cause movement of lever 2, since the slack has already been taken up in the brake rigging assumed to be connected thereto as was previously described. Movement of the piston 11 and rods 18, 24 will tend to compress the liquid in chamber 80 between said piston 11 and the piston 65 which is reluctant to move therewith, so that a quantity of said liquid will be displaced from said chamber via passages 82, 27, 53 chamber 51, the unseated valve 50, and passage 55 into chamber 40 of the reservoir 19.

Movement of reservoir 19 with piston 11 and rods 18, 24 will carry said reservoir in a direction away from the non-pressure head 10 secured to cylinder casing 7, so that the valve stem 54 urged against the outer face of said head by the spring 59 will move outwardly through the bore 56, advancing the valve 50 toward the seat 58. Upon seating of valve 50, the communication between the chamber 80 in the cylinder casing 7 and the chamber 40 in reservoir 19 will be closed, so that the remaining liquid in said chamber 80 will be trapped therein, prevented from escape via passages 82, 27, 53 and chamber 51 by the seated valve 50 and from escape past the piston 65 to chamber 68 by action of the cup 85a. The liquid trapped in chamber 80 will then serve as a positive non-yieldable connection between the piston 11 and the push rod 4, so that any force on said piston tending to cause movement in the direction of chamber 13 thereby will be transmitted to said push rod, and assuming resistance of the lever 2 to further movement, said force will be applied to said lever via the push rod 4 in addition to that applied by brake cylinder device 1, for thus increasing the amount of brake application according to the loaded condition of the car.

Upon release of fluid under pressure from the pressure chamber 12 in the load brake cylinder device 3 and from the empty brake cylinder device 1, the return spring 14 will effect movement of piston 11, rods 18, 24 and reservoir 19 to rest position in which they are shown in the drawing. Return of lever 2 to its position in which it is shown in the drawing may be effected through return means (not shown) associated with the brake rigging, so that push rod 4 of brake cylinder device 3 may thereby be urged in the direction of piston 11 in said device 3.

Before valve stem 55 engages the non-pressure head 10 during return of the piston 11, the liquid in chamber 80 is still trapped therein, and pistons 11 and 65 remain spaced apart as both move in the direction of chamber 12. Substantially at the time the stem 54 engages the non-pressure head 10 said stem will be caused to move inwardly in bores 56, 55, opposing action of spring 59, and will unseat valve 50. The piston 11 will come to rest after the cup 15 thereon seats against the inner wall of the pressure head 9. Upon unseating of the valve 50, liquid in the chamber 80 will be free to flow into the storage chamber 40 in reservoir 19 via passages 80, 27, 53, chamber 51, the unseated valve 50 and passage 55, so that the force exerted by the lever 2 on the push rod 4 will move said rod and piston 65 attached thereto to the position in which it is shown in the drawing in which washer member 86 thereof is in contact with said piston 11, displacing liquid from said chamber 80 to said chamber 40.

Once the chamber 40 of reservoir 19 and the passages and chambers connected thereto in device 3 have been filled with liquid, there is little or no chance for air to enter the chamber 80 which might destroy the liquid connection between pistons 11 and 65 during operation. The collapsible diaphragm 34 allows for removal of liquid from chamber 40 and its return thereto, collapsing inwardly in the direction of said chamber 40 when liquid is removed and expanding or flexing in the direction of chamber 41, when liquid is added or returned to chamber 40. By virtue of the arrangement of diaphragm 34, the volume of the liquid storage chamber 40 in effect is contractile and expansible.

Description—Fig. 3

According to the modification shown in Fig. 3, a reservoir structure 19a is employed which does not require the collapsible diaphragm 34, the atmospheric chamber 41 and the port 44 of the structure shown in Fig. 1. To allow for adding and subtracting quantities of liquid to and from a storage chamber 40a, in reservoir 19a a portion 101 of said chamber is allowed to contain air, rather than liquid, which will contract and expand. To prevent portion 101 from being filled with liquid when such liquid is added via opening 42, a rib 102 is provided around said opening which extends downwardly into chamber 40 to a point below the inner-upper surface of the reservoir. During filling, once the liquid level has reached the edge of rib 102, said liquid will fill the interior of opening 42 without appreciable addition thereof to portion 101 of chamber 40a. The portion 101 forms a pocket of slightly compressed air which opposes displacement by the liquid.

Otherwise, the structure shown in Fig. 3 and its operation may be the same as of the structure shown in Fig. 1.

Summary

It will thus be seen that I have provided an improved fluid pressure motor particularly adapted for use as a load brake cylinder device in an empty and load brake equipment for railway cars or the like. The improved fluid pressure motor comprises a piston operable by fluid under pressure, such as compressed air, and a push rod adapted to be connected to a lever or device to be actuated. While the piston is inactive, the push rod is free to move outwardly relative thereto to any extended position, and upon supply of fluid under pressure to said piston and subsequent to slight movement thereof, said piston and push rod are automatically positively connected together through a column of liquid trapped therebetween. Upon release of fluid under pressure from the piston, the push rod is free to move toward said piston to a rest position.

The improved fluid pressure motor is relatively simple in construction, and portions thereof adapted to contain liquid are adequately sealed from portions adapted to contain compressible fluid under pressure, so that one will not leak to the other.

Having now described my invention, what I claim as new and desire to secure by Letters Patent is:

1. In a fluid pressure brake equipment for a car, comprising an empty brake cylinder device for effecting actuation of a brake lever to take up slack in the brake rigging and subsequently to apply a force to said lever for applying the brakes on said car, the combination of a load brake cylinder device comprising a brake cylinder piston operable by fluid under pressure from a normal rest position, a hollow piston rod secured for movement with said piston, a push rod reciprocable within said piston rod and adapted to be connected to said brake lever for movement therewith to an extended position, a second piston attached to said push rod and slidably mounted in said hollow piston rod forming a chamber therein between said brake cylinder piston and said second piston, a reservoir containing liquid and normally open to said chamber, and valve means operative upon said operation of said brake cylinder piston to close communication between said chamber and said reservoir to trap a column of liquid between said brake cylinder piston and said second piston for applying a force through the extended push rod to said brake lever.

2. A brake cylinder device comprising in combination, a cylinder closed at one end by a pressure head and at the opposite end by a non-pressure head, a brake cylinder piston having a normal rest position and slidably mounted in said cylinder, hollow piston rod means carried by said brake cylinder piston and slidably mounted in a bore through said non-pressure head, a liquid carrying reservoir carried by said piston rod means, a brake applying push rod extending through said hollow rod means, a second piston slidably disposed within said hollow rod means and attached to said brake applying push rod, said second piston defining a chamber with said brake cylinder piston and rod means, a communication connecting said chamber with said reservoir, and normally open valve means controlling said communication operable to a closed position upon movement of said brake cylinder piston out of its normal rest position.

3. A brake cylinder device comprising in combination, a cylinder casing closed at one end by a pressure head and at the opposite end by a non-pressure head, a brake cylinder piston slidably mounted in said cylinder defining with said pressure head a pressure chamber on one side and defining on the opposite side with said non-pressure head a non-pressure chamber, a compression return spring disposed in said non-pressure chamber and interposed between said non-pressure head and said brake cylinder piston for urging the latter in the direction of a normal rest position, first and second hollow piston rods secured at their one end to said brake cylinder piston and extending through a central opening in said non-pressure head, said first piston rod being disposed within and spaced away from said second piston rod to define a fluid pressure passage therebetween, a liquid carrying reservoir secured to the outer ends of said piston rods and open to said fluid pressure passage, a brake applying push rod extending through said first piston rod and said reservoir, a second piston rod slidably mounted in said first hollow piston rod and attached to one end of said brake applying push rod, said second piston defining a chamber with said brake cylinder piston within said first hollow piston rod, a communication for opening the last named chamber to said fluid pressure passage, a sealing element carried by said second piston to prevent leakage of liquid from said last named chamber to the opposite side of said second piston, a normally open valve controlling said communication, and means responsive to movement of said brake cylinder piston away from its normal rest position to effect closure of said valve.

4. A brake cylinder device comprising in combination, a cylinder closed at one end by a pressure head and at the opposite end by a non-pressure head, a brake cylinder piston having a normal rest position and slidably mounted in said cylinder, hollow piston rod means carried by said brake cylinder piston and slidably mounted in a bore through said non-pressure head, a brake applying push rod extending through said hollow rod means, another piston slidably mounted in said hollow rod means and connected to the end of said push rod and cooperative with said brake cylinder piston to form a liquid receiving chamber, a liquid carrying reservoir, and a valve controlling a liquid flow communication between said reservoir and liquid receiving chamber operable by said brake cylinder piston in said rest position to open said communication and upon movement out of said rest position to close said communication.

5. A brake cylinder device comprising in combination, a cylinder closed at one end by a pressure head and at the opposite end by a non-pressure head, a brake cylinder piston having a normal rest position and slidably mounted in said cylinder, hollow piston rod means carried by said brake cylinder piston and slidably mounted in a bore through said non-pressure head, a brake applying push rod extending through said hollow rod means, another piston slidably mounted in said hollow rod means and connected to the end of said push rod and cooperative with said brake cylinder piston to form a liquid receiving chamber, said other piston comprising a packing for preventing flow of liquid from said liquid receiving chamber in the direction to another chamber at the opposite side of said other piston but for permitting flow of liquid in the opposite direction, liquid sealing means between said push rod and hollow rod means at the said opposite side of said other piston for preventing escape of liquid along said push rod from said other chamber, a liquid carrying reservoir, a constantly open communication between said reservoir and said other chamber, a communication between said reservoir and liquid receiving chamber, and a valve controlling the last named communication operable by said brake cylinder piston in said rest position to open said last named communication and operable to close said last named communication upon movement of said brake cylinder piston out of said rest position.

6. A brake cylinder device comprising in combination, a cylinder closed at one end by a pressure head and at the opposite end by a non-pressure head, a brake cylinder piston having a normal rest position and slidably mounted in said cylinder, hollow piston rod means carried by said brake cylinder piston and slidably mounted in a bore through said non-pressure head, a brake applying push rod extending through said hollow rod means, another piston slidably mounted in said hollow rod means and connected to the end of said push rod and cooperative with said brake cylinder piston to form a liquid receiving chamber, a reservoir comprising a casing member secured to said hollow rod means outside of said non-pressure head and a collapsible diaphragm cooperative with said casing member to provide a closed liquid carrying chamber, and a valve controlling a liquid flow communication between said liquid carrying chamber and said liquid receiving chamber operable by said brake cylinder piston to open said communication in said rest position and to close said communication upon movement out of said rest position.

7. A brake cylinder device comprising in combination, a cylinder closed at one end by a pressure head and at the opposite end by a non-pressure head, a brake cylinder piston having a normal rest position and slidably mounted in said cylinder, hollow piston rod means carried by said brake cylinder piston and slidably mounted in a bore through said non-pressure head, a brake applying push rod extending through said hollow rod means, another piston slidably mounted in said hollow rod means and connected to the end of said push rod and cooperative with said brake cylinder piston to form a liquid receiving chamber, a reservoir comprising a casing member secured to said hollow rod means outside of said non-pressure head and a collapsible diaphragm cooperative with said casing member to provide a closed liquid carrying chamber, a valve carried by said casing member controlling a liquid flow communication between said liquid carrying chamber and said liquid receiving chamber and operable by engagement with said non-pressure head to open said communication, and means for operating said valve to close said communication upon movement of said brake cylinder piston out of said rest position.

8. In combination, a push rod, two pistons connected together through a liquid column, one of said pistons being a brake cylinder piston and the other a push rod piston attached to one end of a push rod, said brake cylinder piston being adapted to be operated by fluid under pressure to transmit force through said column to said other piston for actuating said push rod, and said push rod piston being adapted to cause suction of liquid to increase said column upon movement of said pull rod in a direction away from said brake cylinder piston, a reservoir for storing liquid for said column, and means responsive to movement of said brake cylinder piston in the direction of said push rod piston to fix the length of said column, and in the opposite direction to allow for shortening said column.

EARLE S. COOK.

REFERENCES CITED

The following references are of record in the file of this patent:

UNITED STATES PATENTS

| Number | Name | Date |
|---|---|---|
| 2,004,654 | Farmer | June 11, 1935 |